(12) United States Patent
Jacobs et al.

(10) Patent No.: US 12,519,146 B2
(45) Date of Patent: Jan. 6, 2026

(54) THERMISTOR RETENTION POCKET

(71) Applicant: Rivian IP Holdings, LLC, Plymouth, MI (US)

(72) Inventors: Tyler Jacobs, Redondo Beach, CA (US); Aaron Churchill, Irvine, CA (US); Katelyn Rossick, Irvine, CA (US); Diana Kei Eaton, Newport Beach, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 730 days.

(21) Appl. No.: 17/899,725

(22) Filed: Aug. 31, 2022

(65) Prior Publication Data

US 2024/0072315 A1    Feb. 29, 2024

(51) Int. Cl.
*H01M 10/44*    (2006.01)
*H01M 50/209*    (2021.01)

(52) U.S. Cl.
CPC ....... *H01M 10/443* (2013.01); *H01M 50/209* (2021.01); *H01M 2220/20* (2013.01)

(58) Field of Classification Search
CPC ............ H01M 10/443; H01M 50/209; H01M 2220/20
See application file for complete search history.

(56) References Cited

U.S. PATENT DOCUMENTS 9,178,196 B2 * 11/2015 Srinivasan .......... H01M 10/486

* cited by examiner

*Primary Examiner* — Sarah A. Slifka
(74) *Attorney, Agent, or Firm* — Foley & Lardner LLP

(57) ABSTRACT

An apparatus can include a first wall and a second wall, the second wall having an aperture. The apparatus can include an opening defined by the first wall and the second wall, the opening configured to receive a thermistor. The aperture can be configured to receive a retention member of the thermistor to dispose the thermistor in a battery module.

20 Claims, 14 Drawing Sheets

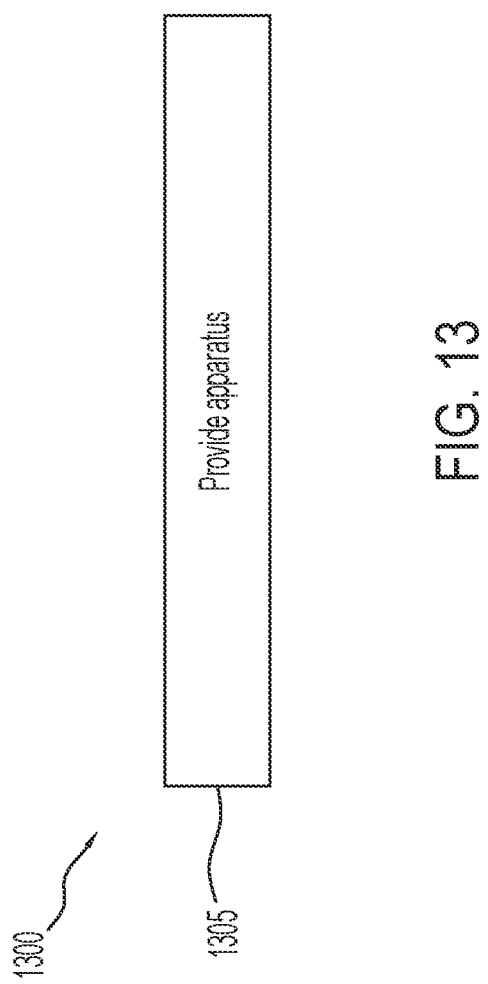

THERMISTOR RETENTION POCKET

INTRODUCTION

Electric vehicles can include batteries that provide power to the electric vehicle. The batteries can be electrically coupled with vehicle components to power the vehicle.

SUMMARY

An apparatus for positioning, orienting, or retaining a thermistor relative to a battery module (or component thereof) having a battery cell can include a first wall and a second wall. The first wall and the second wall can be integrated with the battery module, for example to facilitate uniformity or consistency in forming the battery module or the apparatus. The apparatus can include an opening defined by the first wall and the second wall, for example to facilitate receiving the thermistor. The first wall can interface the thermistor, for example to guide the thermistor as the thermistor is inserted into the battery module. The second wall can also include an aperture, a recess, or a protrusion. The aperture can receive a retention member of the thermistor. The aperture can receive the retention member, so as to position or orient the thermistor relative to the second wall or an adjacent battery cell. In this example, the aperture can receive the retention member, and position the thermistor to facilitate determining a temperature profile of the battery cell or surrounding components (e.g., a battery submodule, battery module, or a battery pack). The aperture can also receive the retention member, so as to retain the thermistor relative to the second wall or the battery module. The retention member can be disposed within the aperture, and the thermistor can be retained within the battery module, for example during installation, vehicle movement, or other displacement or movement of the battery module.

At least one aspect is directed to an apparatus. The apparatus can include a first wall and a second wall, the second wall having an aperture. The apparatus can include an opening defined at least in part by the first wall and the second wall. The opening can be configured to receive a thermistor. The aperture can be configured to receive a retention member of the thermistor to dispose the thermistor in a battery module.

At least one aspect is directed to a battery pack. The battery pack can include a carrier and a battery cell disposed within the carrier. The battery pack can include a thermistor coupled to the carrier and the battery cell, and the thermistor can be configured to indicate a temperature of the battery cell. The carrier can include a first wall and a second wall, and the second wall can include an aperture. The carrier can include an opening defined at least in part by the first wall and the second wall, and the opening can be configured to receive the thermistor. The aperture can be configured to receive a retention member of the thermistor to dispose the thermistor in the carrier.

At least one aspect is directed to a method. The method can include providing a first wall and a second wall, the second wall can have an aperture. The method can also include providing an opening defined at least in part by the first wall and the second wall. The method can include receiving a thermistor at the opening with a retention member of the thermistor disposed within the aperture to dispose the thermistor in a battery module.

At least one aspect is directed to an apparatus. The apparatus can include a first wall and a second wall. The first wall and the second wall can define an opening to receive a thermistor. The second wall can include an aperture configured to receive a retention member of the thermistor to dispose the thermistor in a battery module.

At least one aspect is directed to a battery pack. The battery pack can include a carrier and a battery cell disposed within the carrier. The battery pack can include a thermistor coupled to the carrier and the battery cell, and the thermistor can be configured to indicate a temperature of the battery cell. The carrier can include a first wall and a second wall that define an opening to receive the thermistor. The second wall can include an aperture configured to receive a retention member of the thermistor.

At least one aspect is directed to a method. The method can include providing a first wall and a second wall having an aperture. The first wall and the second wall can define an opening. The method can include receiving a thermistor at the first wall and the second wall with a retention member of the thermistor disposed within the aperture.

At least one aspect is directed to an electric vehicle. The electric vehicle can include a battery pack having a carrier and a battery cell disposed within the carrier. The battery pack can include a thermistor coupled to the carrier and the battery cell, and the thermistor can be configured to indicate a temperature of the battery cell. The carrier can include a first wall and a second wall that define an opening to receive the thermistor. The second wall can include an aperture configured to receive a retention member of the thermistor.

At least one aspect is directed to a method of providing an apparatus. The apparatus can include a first wall and a second wall. The first wall and the second wall can define an opening to receive a thermistor. The second wall can include an aperture configured to receive a retention member of the thermistor to dispose the thermistor in a battery module.

At least one aspect is directed to a method of providing a battery pack. The battery pack can include a carrier and a battery cell disposed within the carrier. The battery pack can include a thermistor coupled to the carrier and the battery cell, and the thermistor can be configured to indicate a temperature of the battery cell. The carrier can include a first wall and a second wall that define an opening to receive the thermistor. The second wall can include an aperture configured to receive a retention member of the thermistor.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 13 depicts an example illustration of a method, in accordance with implementations.

DETAILED DESCRIPTION

Figure 1:
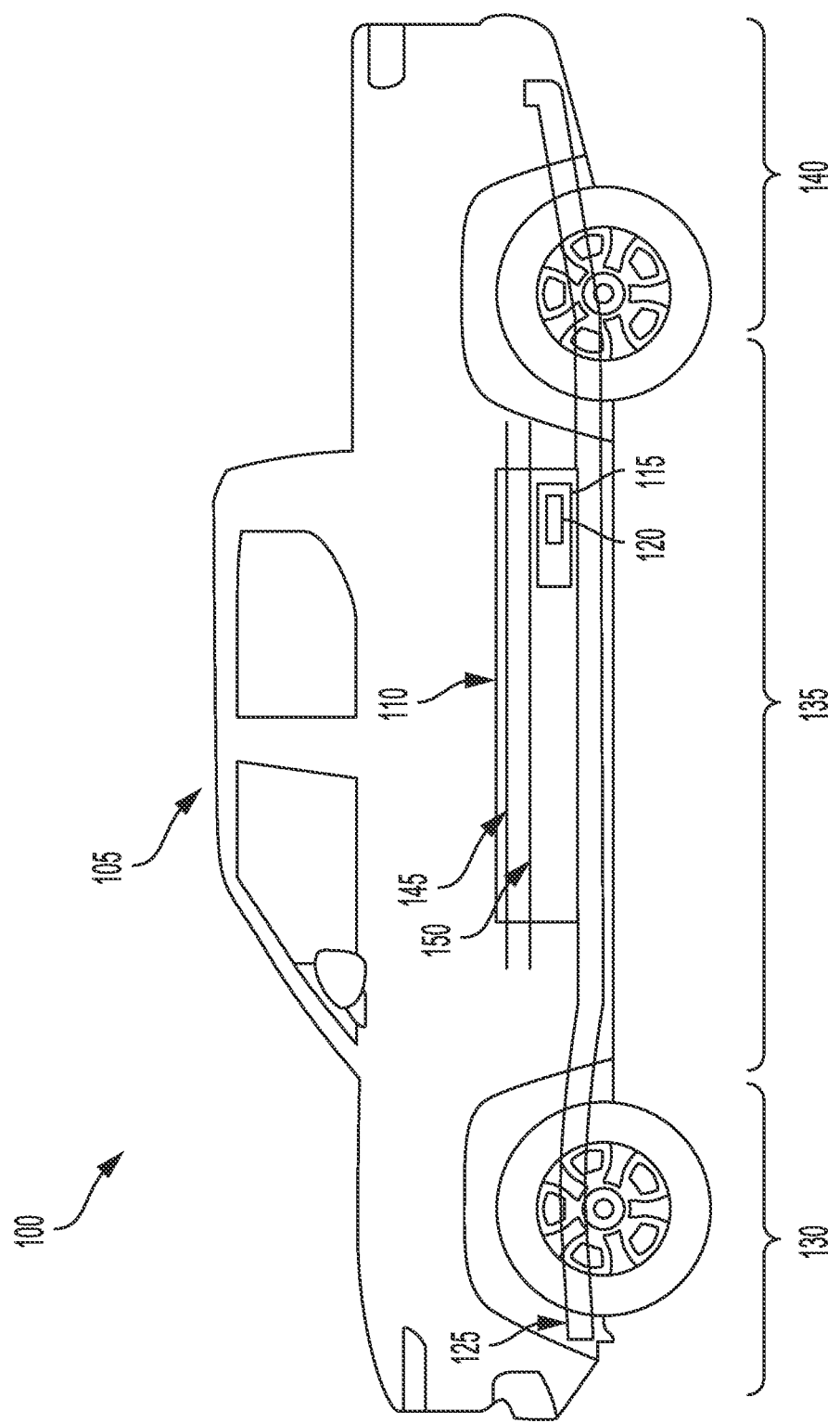
FIG. 1 depicts an example side view of an electric vehicle, in accordance with implementations.

Following below are more detailed descriptions of various concepts related to, and implementations of, methods, apparatuses, and systems of coupling a battery with a vehicle. The various concepts introduced above and discussed in greater detail below may be implemented in any of numerous ways.

This disclosure is generally directed to a thermistor retention pocket of a battery module designed to position, orient, or retain a thermistor relative to a battery cell disposed in the battery module. The disclosed solutions have a technical advantage of coupling features that facilitate retention of the thermistor within the battery module during installation, vehicle movement, or other displacement or movement of the battery module. In addition, the retention pocket can include connection that provide structural components to facilitate proper positioning of a thermistor relative to an adjacent battery cell, for example to facilitate accurate characteristic measurements of the battery cell (e.g., temperature, chemical, electrical, power, output, or other characteristics). Further, the components of the retention pocket can be integrated with, or machined as a part of, components of the battery module to facilitate uniformity in fabricating the battery module and retention pocket, as well as uniformity in the connection between the thermistor and retention pocket.

The proposed solution can include a first wall and a second wall defining an opening in the battery module. The first wall can include a planar surface, and the second wall can include an aperture and a recess. The first wall can contact or interface a housing of the thermistor, for example to position the thermistor as the thermistor is inserted into the retention pocket. Further, as the thermistor is inserted into the retention pocket, a retention arm of the thermistor can contact or interface the recess of the second wall, for example to guide the thermistor into the retention pocket. As the thermistor is inserted into the retention pocket, a retention member of the thermistor may interface (e.g., fit into, or be received within) the aperture of the second wall, for example to position, orient, or retain the thermistor within the retention pocket. The aperture and retention member may be visible from an exterior portion of the battery module, for example to provide a visual indication that the thermistor is appropriately positioned within the retention pocket. The second wall can further include a protrusion at an interior portion of the second wall, for example to contact the retention arm of the thermistor or to limit movement of the thermistor toward the interior portion of the battery module (e.g., into the adjacent battery cell).

The proposed solution can be integrated into one or more battery modules or submodules, or the outer housing of the battery module or submodule that can be referred to herein as a carrier tote. The retention pocket can be positioned at a lower, exterior corner of a battery submodule (e.g., an upper battery submodule), or an upper, exterior corner of a battery module (e.g., a lower battery submodule). The retention pockets and thermistors of a battery module can be positioned and oriented to measure the characteristics (e.g., temperature) of one or more battery cells of a battery module, for example to determine a profile (e.g., a temperature profile) of the battery cells of a battery module. The battery modules or submodules can include one retention pocket, and the retention pocket can receive one thermistor. Further, the thermistor can include a single retention arm (e.g., having a single retention member), for example to facilitate positioning and retaining the thermistor within the retention pocket.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
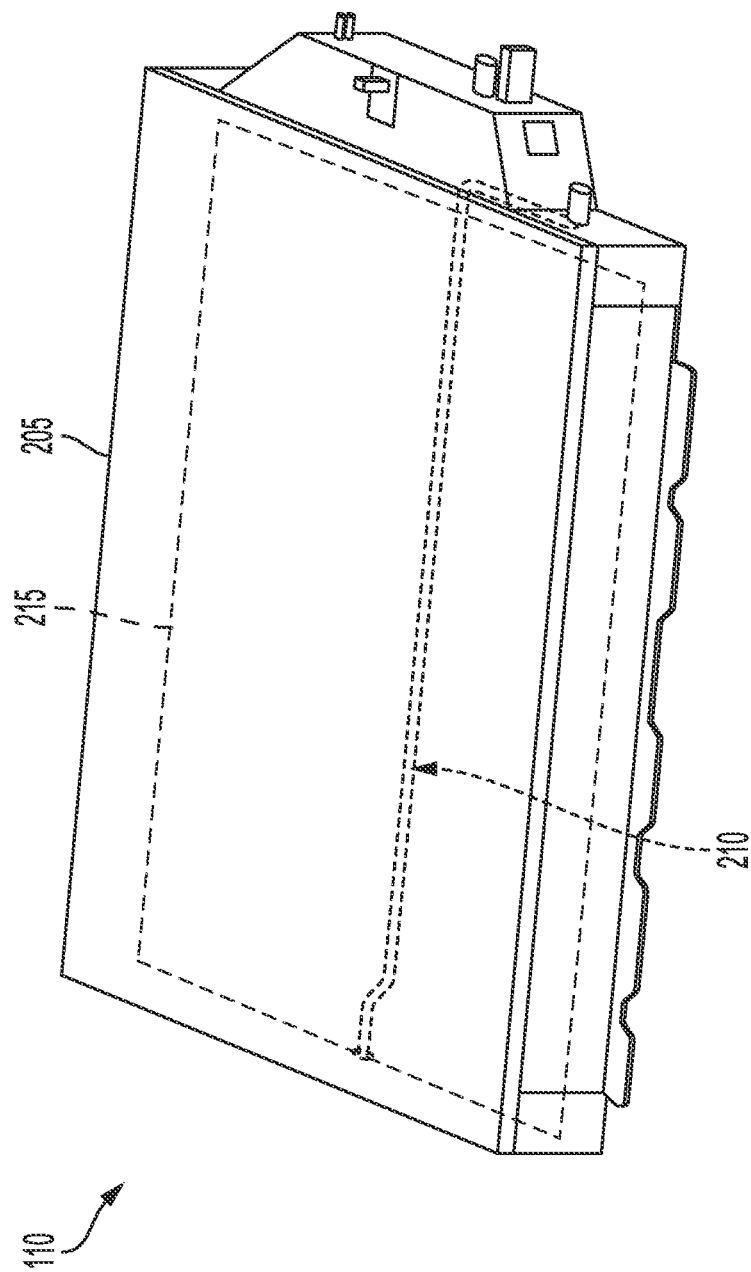
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, or other terrain) The battery pack 110 can include at least one cooling line 210 that can distribute fluid through the battery pack 110 as part of a thermal/temperature control or heat exchange system that can also include at least one thermal component 215 (e.g., cold plate). The thermal component 215 can be positioned in relation to a top submodule and a bottom submodule, such as in between the top and bottom submodules, as described herein. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
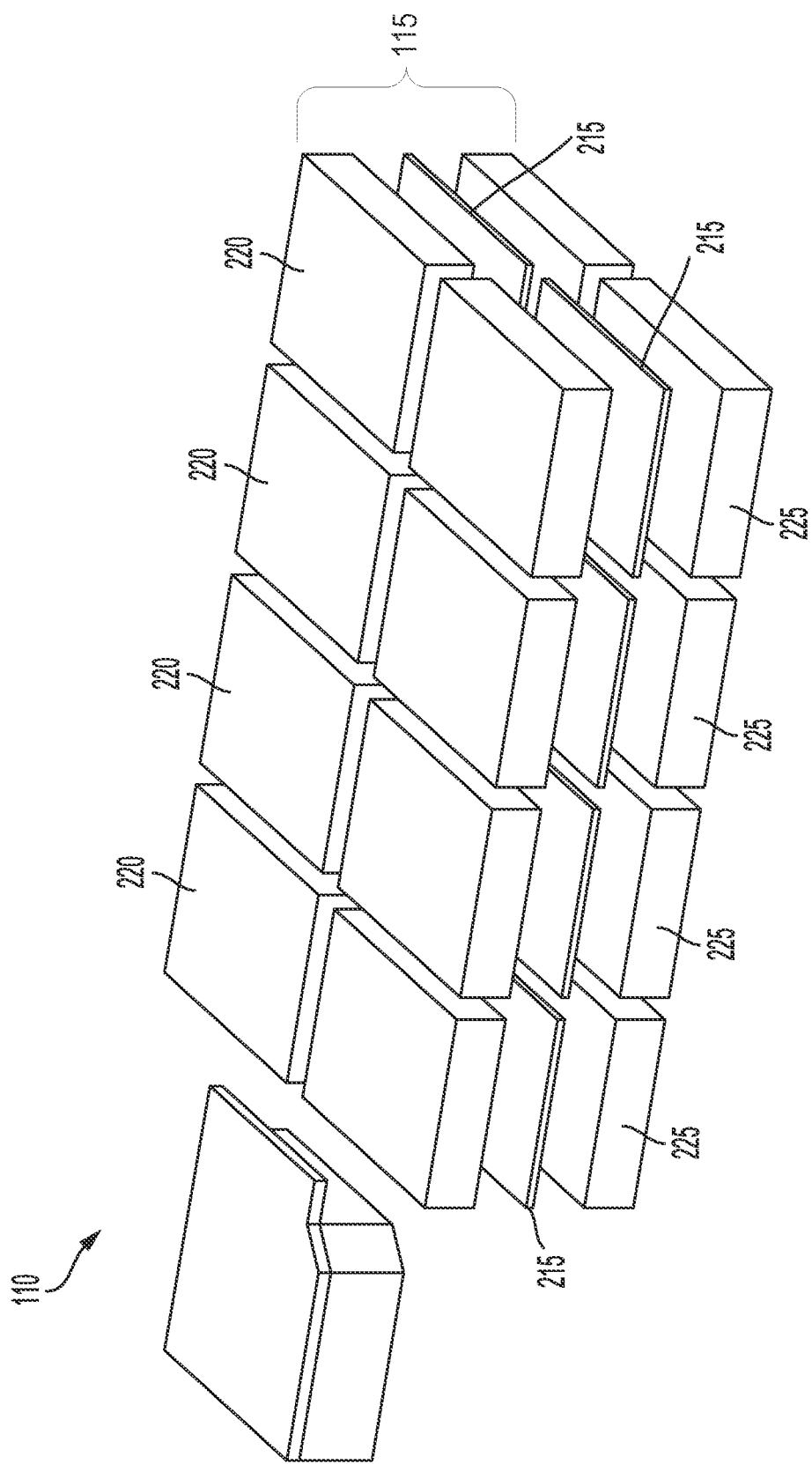
FIG. 2B depicts an example perspective view of a battery module, in accordance with implementations.

FIG. 2B depicts example battery modules 115. The battery modules 115 can include at least one submodule. For example, the battery modules 115 can include at least one first (e.g., top) submodule 220 or at least one second (e.g., bottom) submodule 225. At least one thermal component 215 can be positioned (e.g., disposed) between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115.

The battery modules 115 can each include a plurality of battery cells 120. The battery modules 115 can be disposed within the housing 205 of the battery pack 110. The battery modules 115 can include battery cells 120 that are cylindrical cells, prismatic cells, pouch cells, or pack cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, with a thermal component 215 in between the top submodule 220 and the bottom submodule 225 as described herein. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing. The electrolyte material, e.g., an ionically conductive fluid or other material, can generate or provide electric power for the battery cell 120. A first portion of the electrolyte material can have a first polarity, and a second portion of the electrolyte material can have a second polarity. The housing can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing can be disposed in the battery module 115, the battery pack 110, or a battery array installed in the electric vehicle 105. The housing can be of any shape, such as cylindrical with a circular (e.g., as depicted), elliptical, or ovular base, among others. The shape of the housing can also be prismatic with a polygonal base, such as a triangle, a square, a rectangle, a pentagon, and a hexagon, among others.

Figure 3:
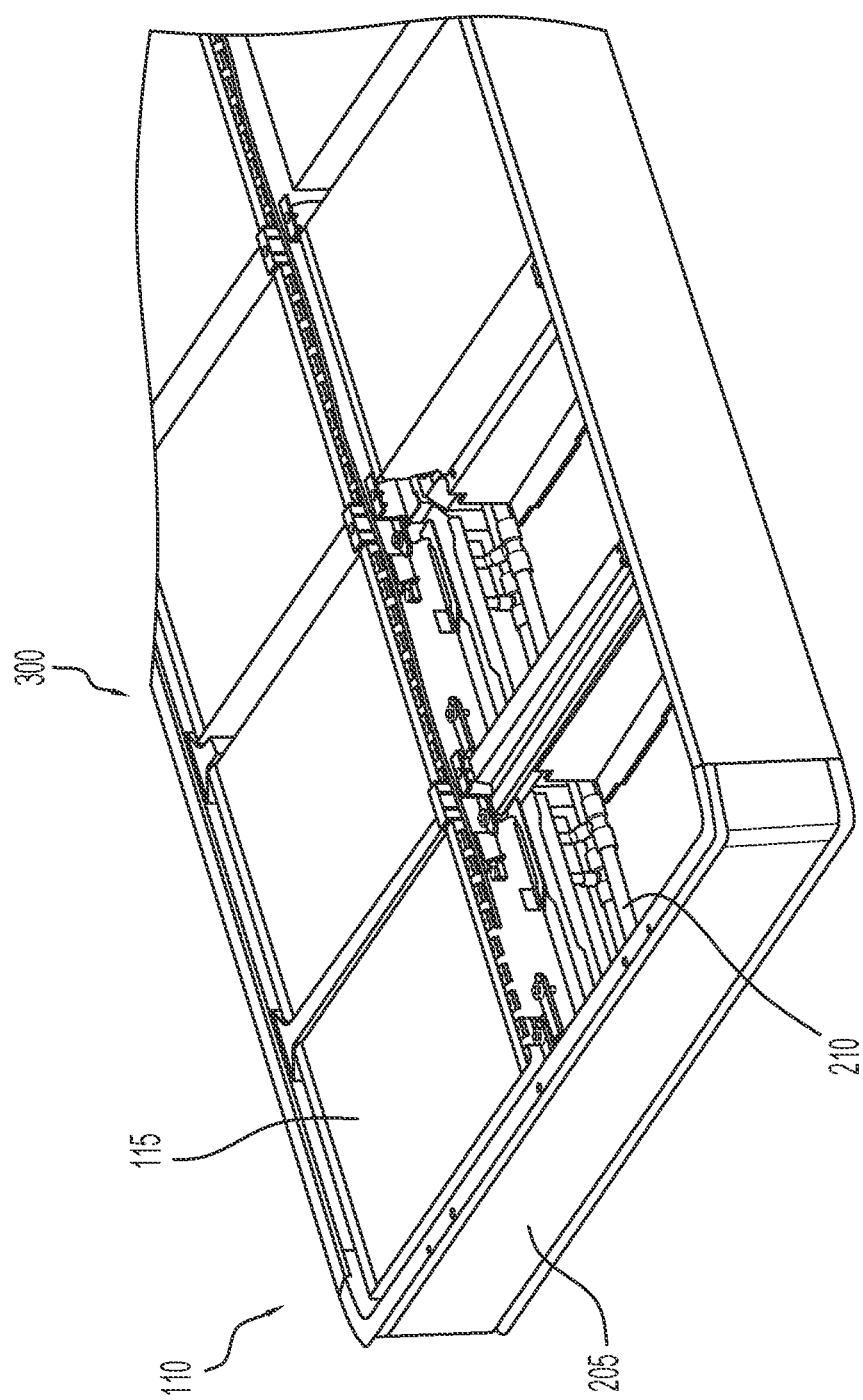
FIG. 3 depicts an example perspective view of a battery pack system, in accordance with implementations.

FIG. 3 depicts an example perspective view of a battery pack system 300 of the vehicle 105. The battery pack system 300 can include at least one battery pack 110 having one or more battery modules 115 coupled with the battery pack 110. The battery pack system 300 can include various components that facilitate coupling (e.g., mechanically or electrically) with at least one battery module 115 with the battery pack 110, or with another portion of the vehicle 105.

Figure 4:
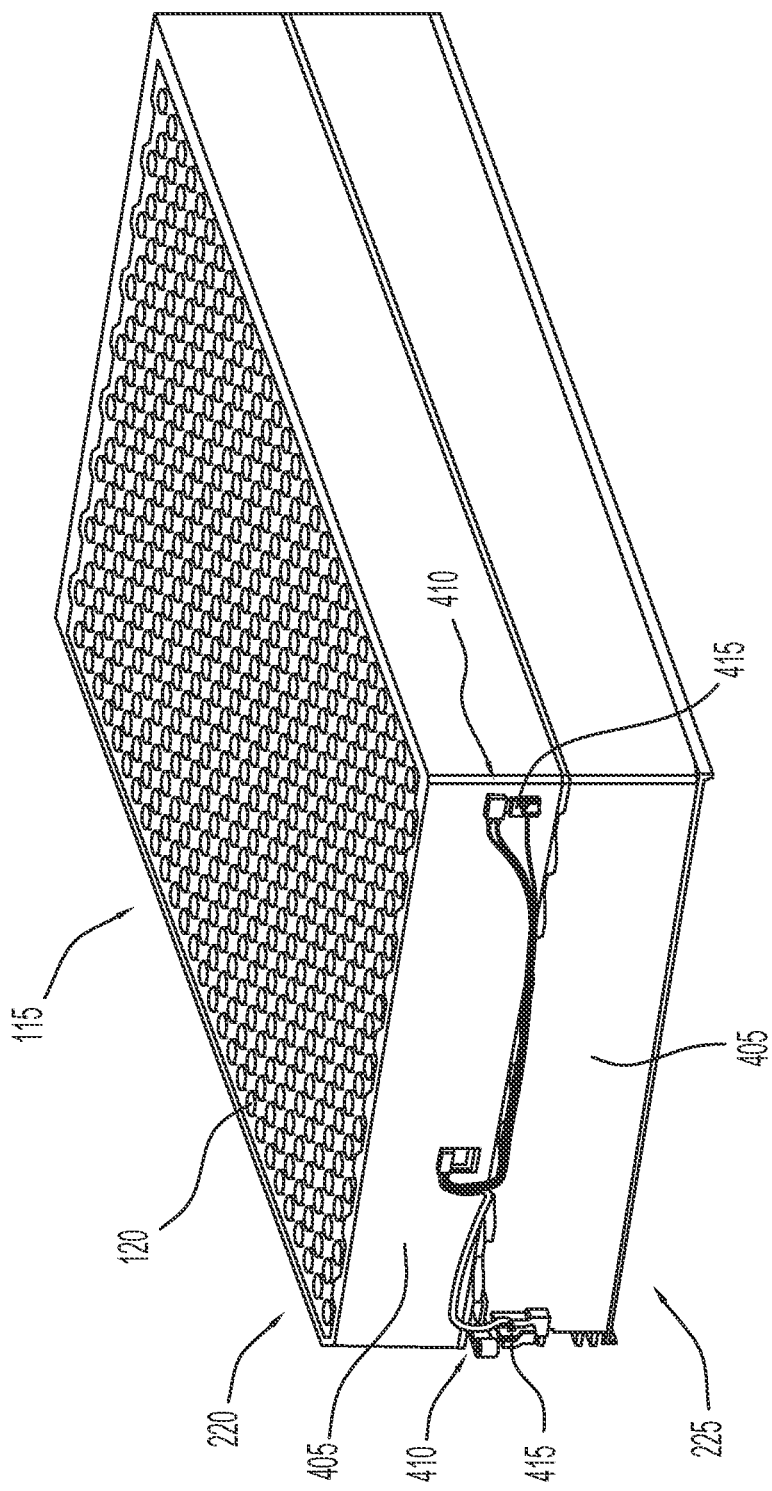
FIG. 4 depicts an example perspective view of a battery module, in accordance with implementations.

FIG. 4 depicts an example perspective view of a battery module 115. Each of the first submodule 220 and the second submodule 225 can be, can include, or can be formed by an exterior carrier tote (e.g., exterior carrier 405) for one or more battery cells 120. For example, the first submodule 220 or the second submodule 225 can include an exterior carrier 405 that can facilitate carrying the battery cells 120. The exterior carrier 405 can include one or more surfaces, apertures, supports, or other components that can receive a plurality of battery cells 120 to form the submodule. The exterior carrier 405 can include a casing that carries the battery cells 120 of the submodule. The exterior carrier 405 can include one or more holes that can each receive and store a battery cell 120. For example, each hole of the exterior carrier 405 can include a depth to receive a lower portion of a battery cell 120 (e.g., a depth of a hole can be about equal to or less than a length of a battery cell 120). The exterior carrier 405 can include one or more grooves positioned along one or more side surfaces of the exterior carrier 405 to facilitate aligning each battery cell 120. The through holes or the grooves of the exterior carrier 405 can include various shapes (e.g., cylindrical, round, oblong, hexagonal, prismatic, pouch, or another shape) to receive each battery cell 120. The battery cells 120 can be coupled with the through holes using one or more adhesives. For example, adhesives can facilitate mounting each battery cell 120 to each hole such that movement of the battery cells 120 relative to the holes is limited.

The exterior carrier 405 can include at least one apparatus 410. The apparatus 410 can include components to receive at least one thermistor 415. For example, the apparatus 410 can receive the thermistor 415 to position, orient, or retain the thermistor 415 relative to a battery cell 120 disposed within the exterior carrier 405. The apparatus 410 can be integrated (e.g., machined, manufactured, formed, or otherwise incorporated) with the exterior carrier 405. For example, the apparatus 410 can be integrated with the exterior carrier 405 to facilitate uniformity and consistency in forming (e.g., machining or manufacturing) the exterior carrier 405 or the apparatus 410.

The apparatus 410 can be positioned at an exterior portion of the exterior carrier 405. For example, the apparatus 410 can be positioned at a bottom portion of a corner of the exterior carrier 405 (e.g., the apparatus 410 of the first submodule 220 depicted in at least FIG. 4), or a top portion of a corner of the exterior carrier 405 (e.g., the apparatus 410 of the second submodule 225 depicted in at least FIG. 4). A first apparatus 410 can be positioned at a bottom portion of a corner of the exterior carrier 405 (e.g., of the first submodule 220 depicted in at least FIG. 4) and a second apparatus 410 can be positioned at a top portion of a corner of the exterior carrier 405 (e.g., of the second submodule 225 depicted in at least FIG. 4). The apparatus 410 can receive one thermistor 415, for example to facilitate determining a temperature profile of the adjacent battery cell 120 or a submodule (e.g., the first submodule 220 or the second submodule 225). The apparatus 410 can receive the thermistor 415, and position, orient, or retain the thermistor 415 relative to a battery cell 120 to facilitate determining a temperature profile of the battery cell 120 or the surrounding submodule (e.g., the first submodule 220 or the second submodule 225).

The exterior carrier 405 can include one apparatus 410 or a plurality of apparatuses 410 (e.g., two, three, four, ten, or another number). The apparatus 410 can receive one thermistor 415 or a plurality of thermistors 415 (e.g., two, three, four, or another number). The apparatus 410 can be positioned at an interior portion, a middle portion, or another suitable portion (e.g., a top portion, bottom portion, or another portion) of the exterior carrier 405. The apparatus 410 can also be included in at least one battery submodule (e.g., the first submodule 220 or the second submodule 225), at least one battery module (e.g., the battery module 115), at least one battery pack (e.g., the battery pack 110), or another suitable component of the vehicle 105.

FIGS. 5-11, among others, depict example views of a portion of the exterior carrier 405. For example, FIGS. 5-11 depict example views of the exterior carrier 405 having the apparatus 410. The apparatus 410 can be integrated (e.g., continuous, uniform, machined, part of, or manufactured) with the exterior carrier 405, for example to facilitate uniformity or consistency in forming the exterior carrier 405 or the apparatus 410. The apparatus 410 can receive the thermistor 415, for example to position, orient, or retain the thermistor 415 relative to a battery cell 120 disposed within the exterior carrier 405 (as depicted in at least FIG. 11). The apparatus 410 can facilitate determining a temperature profile (e.g., via the thermistor 415) of an adjacent battery cell 120 or a plurality of battery cells (e.g., of a submodule, a battery module, a battery pack, or another component of a vehicle). The temperature profile can indicate an absolute temperature, a change in temperature, a relative temperature, a change in temperature over a period of time, a temperature compared to a threshold, among other temperature characteristics. The apparatus 410 can facilitate determining a temperature profile of a battery cell 120, which can facilitate determining a temperature profile of a surrounding submodule (e.g., the first submodule 220 or the second submodule 225), a battery module (e.g., the battery module 115), a battery pack (the battery pack 110), or another component of the vehicle 105.

Figure 5:
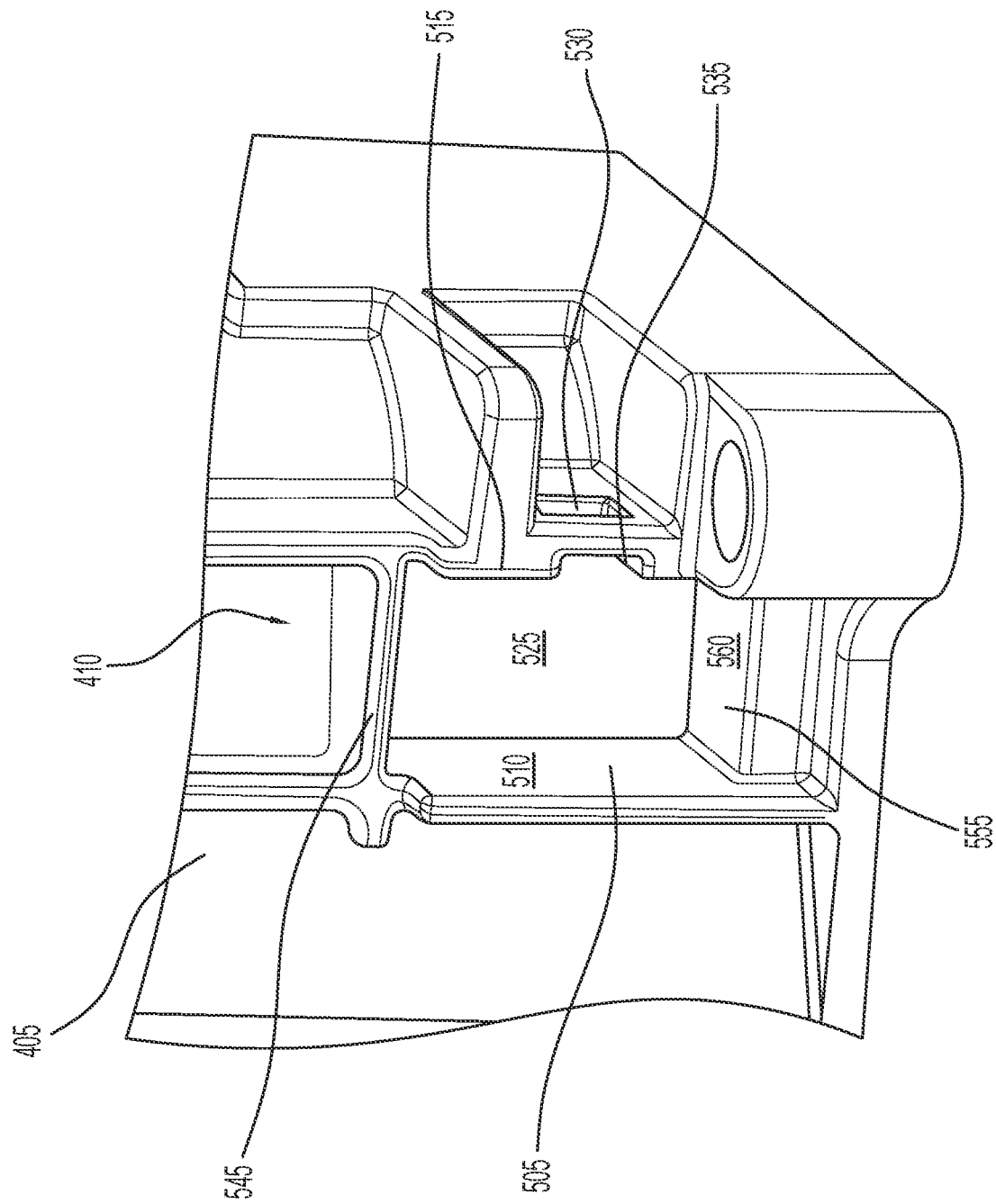
FIG. 5 depicts an example perspective view of an apparatus of an exterior battery module, in accordance with implementations.
Figure 6:
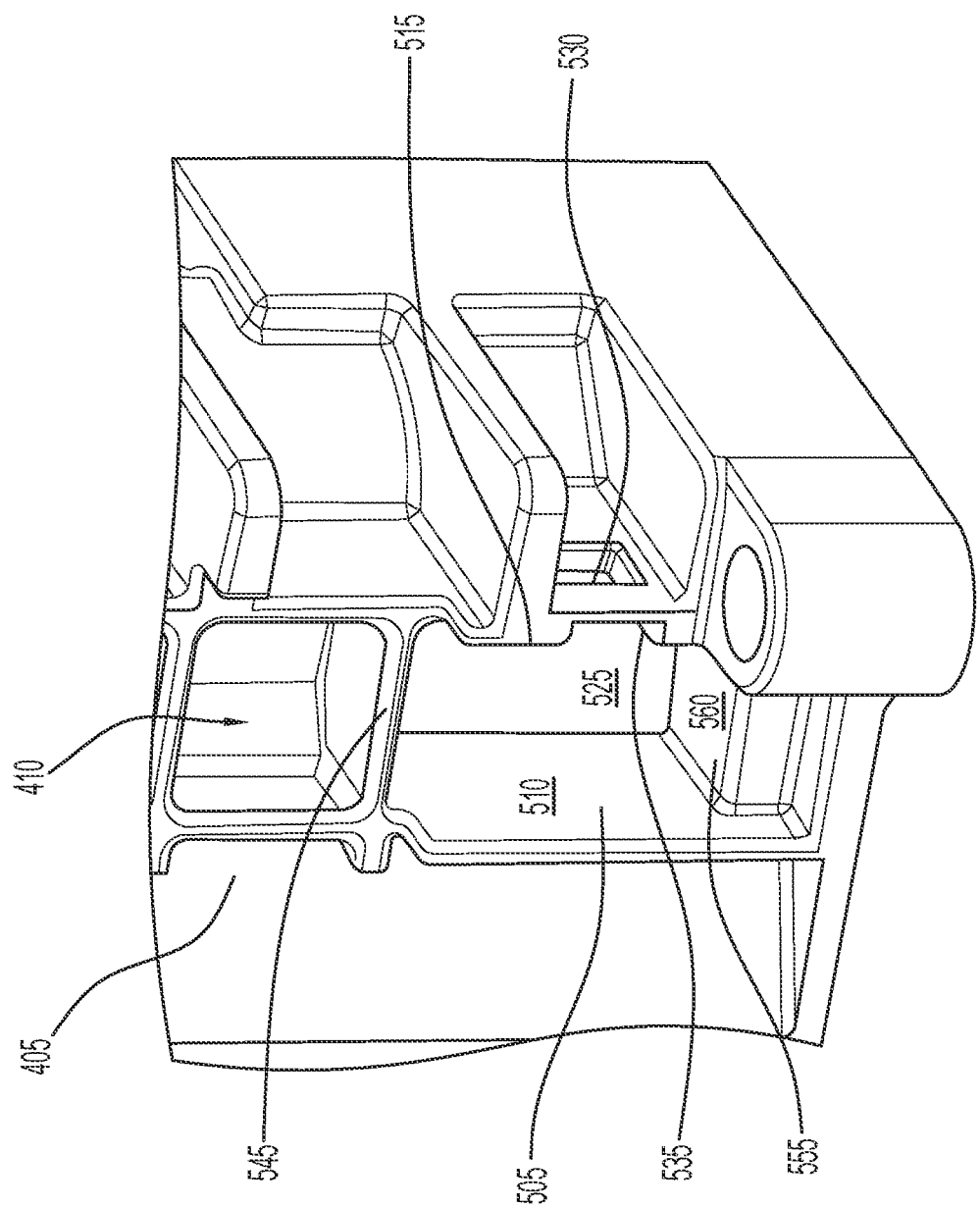
FIG. 6 depicts an example perspective view of the apparatus of FIG. 5, in accordance with implementations.
Figure 7:
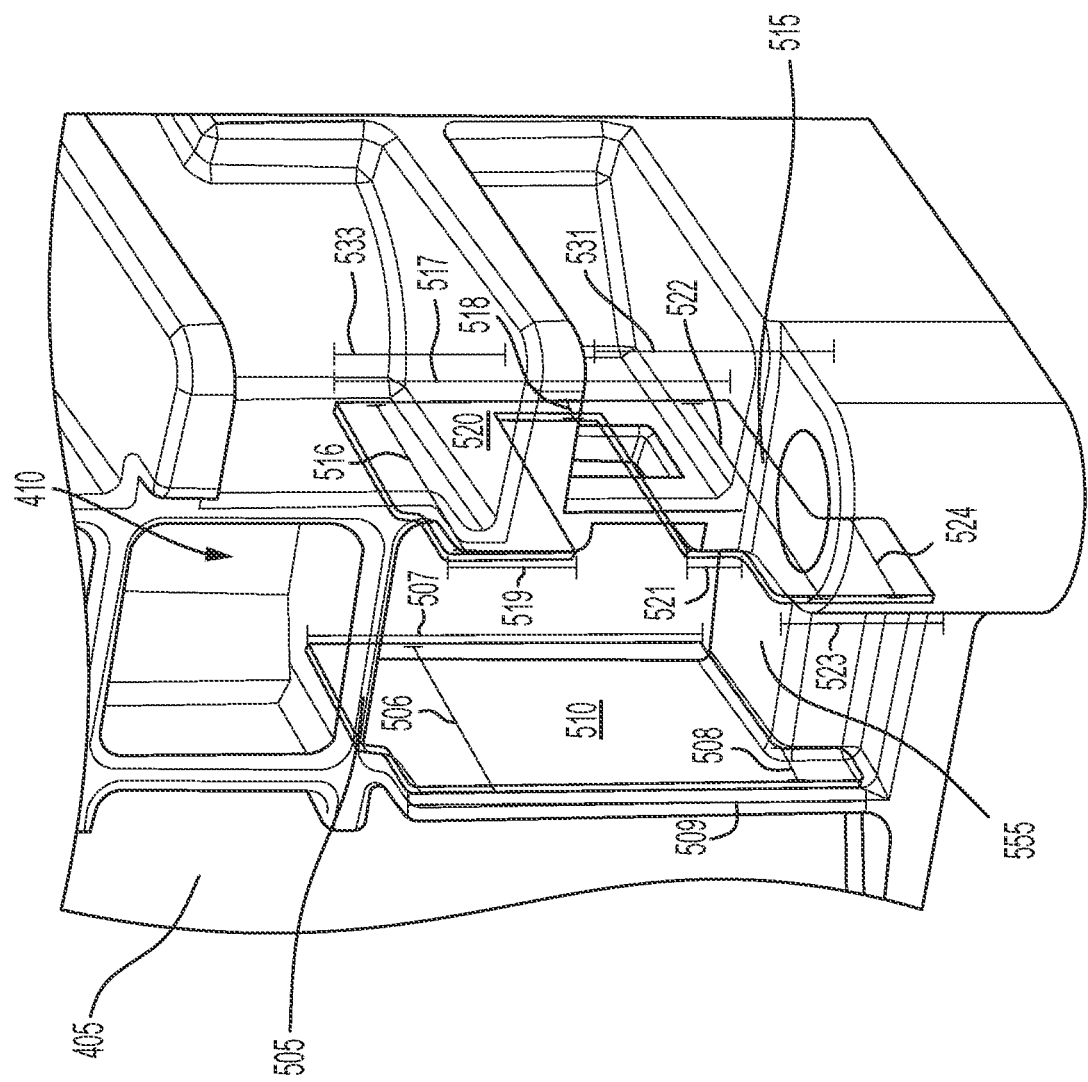
FIG. 7 depicts an example perspective view of the apparatus of FIG. 5, in accordance with implementations.
Figure 8:
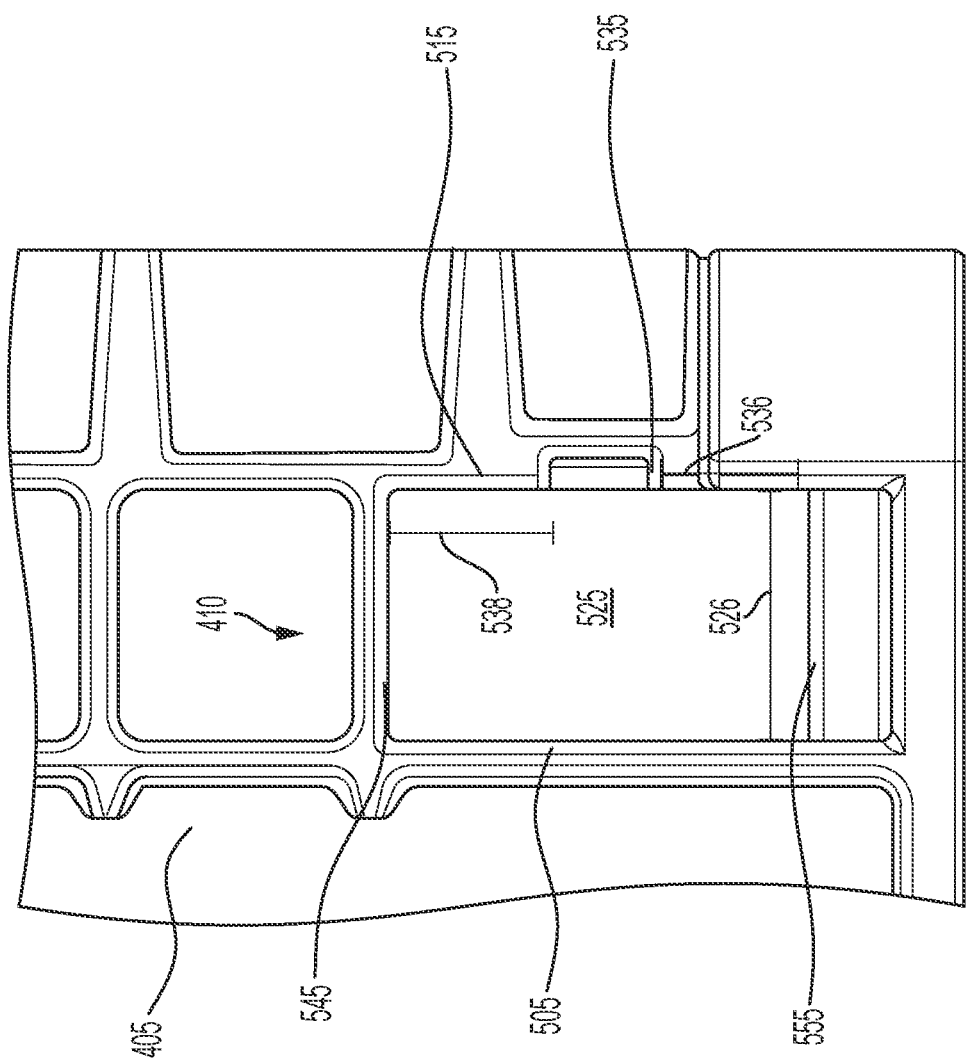
FIG. 8 depicts an example front view of the apparatus of FIG. 5, in accordance with implementations.

The apparatus 410 can include at least one first wall 505 (depicted in at least FIGS. 5-7). For example, the first wall 505 can extend between an exterior surface of the exterior carrier 405 and an interior surface of the exterior carrier 405. The first wall 505 can interface (e.g., contact, engage, guide, or otherwise interact) with the thermistor 415. For example, the first wall 505 can interface a housing of the thermistor 415 as the thermistor 415 is inserted into the exterior carrier 405, so as to guide or position the thermistor 415 relative to components of the apparatus 410 (as depicted in at least FIG. 11).

The first wall 505 can have a width 506 and a height 507 (depicted in at least FIG. 7). For example, the first wall 505 can have a width 506 of about (e.g., within 10%) 10.4 millimeters and a height 507 of about (e.g., within 10%) of 17.3 millimeters. The first wall 505 can have a first portion having a first width (e.g., width 506), and a second portion having a second width (e.g., a width 508). The first wall 505 can also have a first portion having a first height (e.g., height 507), and a second portion having a second height (e.g., a height 509). The first wall 505 can be rectangular, or another suitable shape or configuration (e.g., square, rectangular with an extension, hexagonal, circular, or oval, among other shapes). The first wall 505 can have any suitable shape or configuration (e.g., width, height, or shape) such that when the thermistor 415 interfaces with the first wall 505, a probe of the thermistor 415 interfaces (e.g., contacts, touches, engages) an adjacent battery cell 120, as depicted in at least FIG. 11.

The first wall 505 can include at least one surface 510 (depicted in at least FIG. 7). For example, the surface 510 can be a planar surface to interface (e.g., contact, engage, guide, or otherwise interact with) the thermistor 415. The surface 510 can be uniform or continuous, for example a smooth interface. The surface 510 can also be non-planar (e.g., curved, rounded, convex, concave, or another configuration), or include a textured interface (e.g., lattice, granulated, comb, lace, popcorn, or another interface). For example, the surface 510 can include a non-planar end or edge (e.g. curved, rounded, or chamfered) to facilitate guiding the thermistor 415 (e.g., during insertion or removal) or a textured interface (e.g., lattice or granulated interface) to facilitate retaining the position of the thermistor 415 relative to the first wall 505 (e.g., via a press-fit, friction, or another engagement).

The apparatus 410 can include at least one second wall 515 (depicted in at least FIGS. 5-7). For example, the second wall 515 can extend between an exterior surface of the exterior carrier 405 and an interior surface of the exterior carrier 405. The second wall 515 can interface (e.g., contact, engage, guide, or otherwise interact) with the thermistor 415. For example, the second wall 515 can interface a housing of the thermistor 415 as the thermistor 415 is inserted into the exterior carrier 405, so as to guide or position the thermistor 415 relative to components of the apparatus 410 (as depicted in at least FIG. 11).

The second wall 515 can have a width 516 and a height 517 (depicted in at least FIG. 7). For example, the second wall 515 can have a width 516 of about (e.g., within 10%) 10.4 millimeters and a height 517 of about (e.g., within 10%) of 17.3 millimeters. The width 516 of the second wall 515 can be the same as the width 506 of the first wall 505, or the width 516 of the second wall 515 can be different from the width 506 of the first wall 505. The height 517 of the second wall 515 can also be the same as the height 507 of the first wall 505, or the height 517 of the second wall 515 can be different from the height 507 of the first wall 505. The second wall 515 can have a first portion having a first width (e.g., width 516), a second portion having a second width (e.g., a width 518), a third portion having a third width (e.g., a width 522), or a fourth portion having a fourth width (e.g., a width 524). The second wall 515 can also have a first portion having a first height (e.g., height 517), a second portion having a second height (e.g., a height 519), a third portion having a third height (e.g., a height 521), or a fourth portion having a fourth height (e.g., a height 523). The second wall 515 can include one or more portions that can be rectangular, or another suitable shape or configuration (e.g., square, rectangular with an extension, hexagonal, circular, or oval, among other shapes). The second wall 515 can have any suitable shape or configuration (e.g., width, height, or shape) such that when the thermistor 415 interfaces with the second wall 515, a probe of the thermistor 415 interfaces (e.g., contacts, touches, engages, or otherwise interacts) with an adjacent battery cell 120 (as depicted in at least FIG. 11).

The second wall 515 can include a surface 520 (depicted in at least FIG. 7). For example, the surface 520 can be a planar surface to interface (e.g., contact, engage, guide, or otherwise interact) with the thermistor 415. The surface 520 can be uniform or continuous, for example a smooth interface. The surface 520 can also be non-planar (e.g., curved, rounded, convex, concave, or another configuration), or include a textured interface (e.g., lattice, granulated, comb, lace, popcorn, or another interface). For example, the surface 520 can include a non-planar end or edge (e.g., curved, rounded, or chamfered) to facilitate guiding the thermistor 415 (e.g., during insertion or removal), or a textured interface (e.g., lattice or granulated interface) to facilitate retaining the position of the thermistor 415 relative to the second wall 515 (e.g., via a press-fit, friction, or another engagement).

The apparatus can include at least one opening 525. The at least one opening 525 can be defined by at least the first wall 505 and the second wall 515. For example, the first wall 505 and the second wall 515 can define the opening 525 and facilitate receiving the thermistor 415 (depicted in at least FIG. 11). The first wall 505 and the second wall 515 can be separated by a distance 526 (depicted in at least FIG. 8). For example, the first wall 505 and the second wall 515 can be separated by a distance 526 of about (e.g. within 10%) 10.4 millimeters. The first wall 505 and the second wall 515 can be parallel. The first wall 505 and the second wall 515 can also be otherwise oriented, for example the first wall 505 can be angled relative to the second wall 515 (e.g., 15, 20, 25, 45, or other degrees) or the first wall 505 can be perpendicular to the second wall 515. The first wall 505 and the second wall 515 can be oriented so as to define the opening 525, which can be any suitable shape or configuration (e.g., rectangular, square, hexagonal, circular, or oval, among other shapes).

Figure 9:
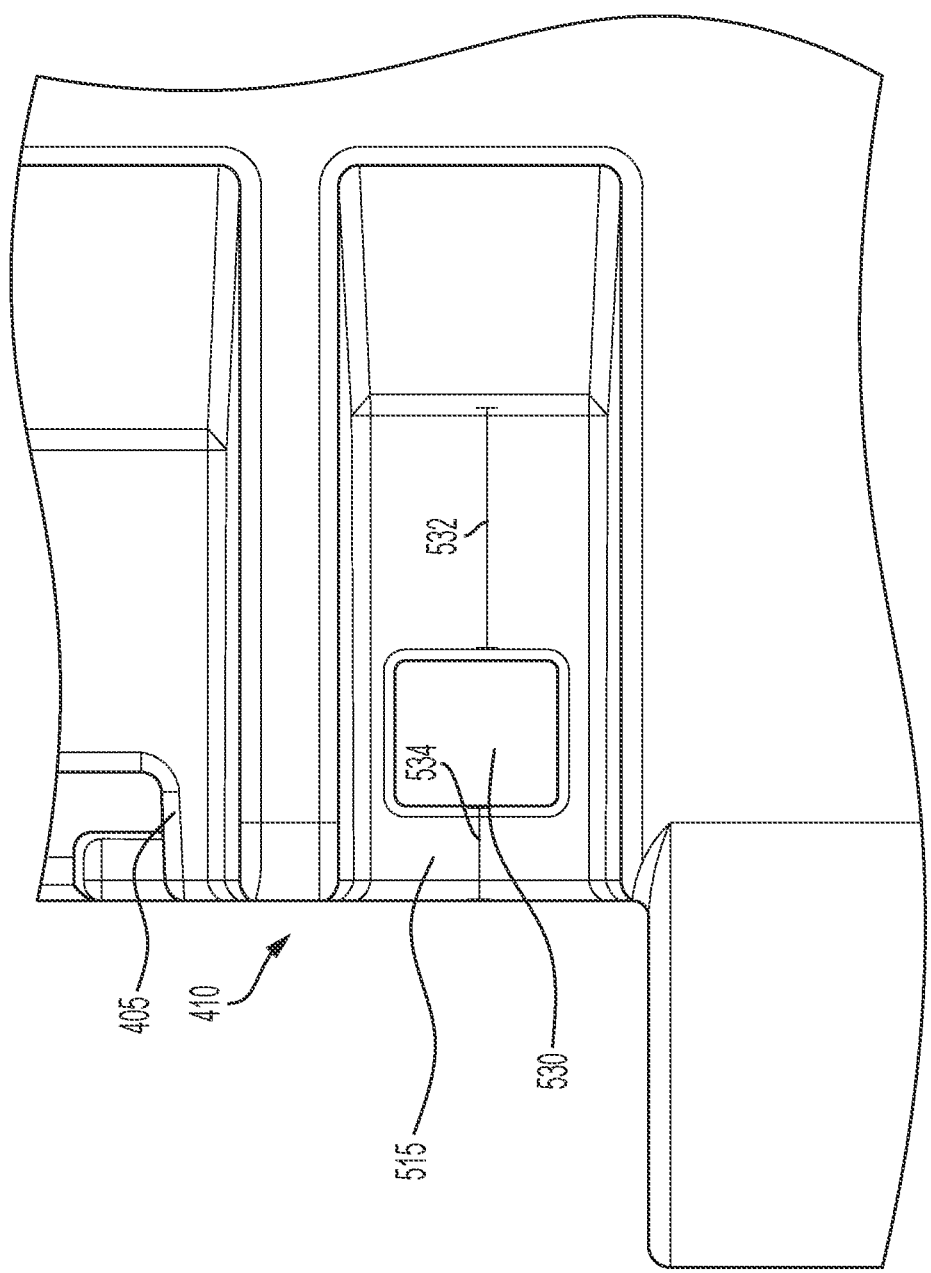
FIG. 9 depicts an example side view of the apparatus of FIG. 5, in accordance with implementations.
Figure 10:
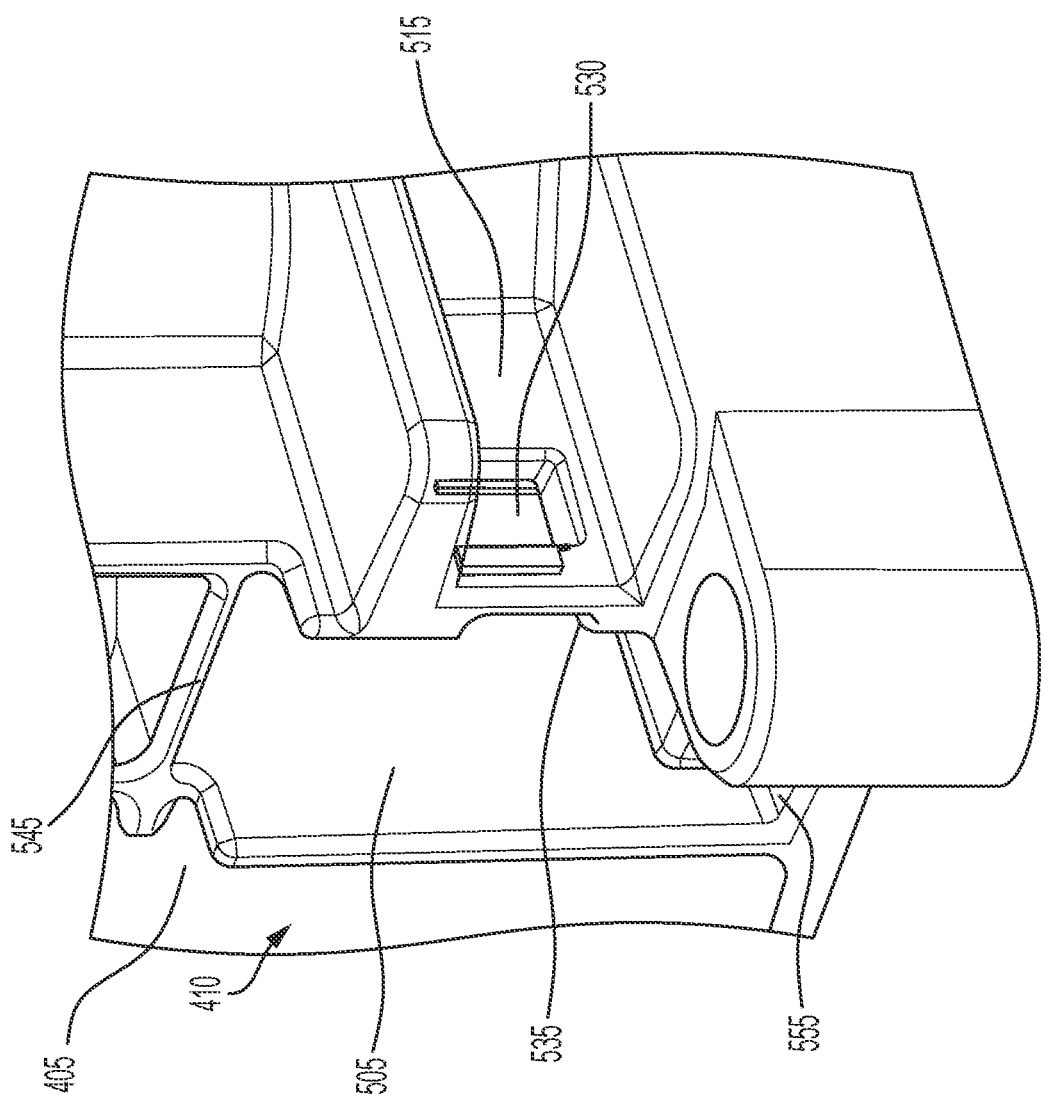
FIG. 10 depicts an example perspective view of the apparatus of FIG. 5, in accordance with implementations.

The second wall 515 can include at least one aperture 530 (depicted in at least FIGS. 9-10). For example, the aperture 530 (e.g., hole, orifice, opening, or void) can extend from an interior surface of the second wall 515 (e.g., the surface 520) to an exterior surface of the second wall 515. The aperture 530 can receive a component of the thermistor 415. For example, a retention member of the thermistor 415 can be received (e.g., fit into, or be disposed within) by the aperture 530 as the thermistor 415 is inserted into the exterior carrier 405 to facilitate positioning, orienting, or retaining the thermistor 415 relative to the exterior carrier 405 (e.g., a battery cell 120 disposed therein). The aperture 530 can also extend to an exterior surface of the exterior carrier 405, for example to facilitate visual inspection of the positioning or orientation of the thermistor 415 relative to the apparatus 410 (e.g., the aperture 530 or the second wall 515), as depicted in at least FIGS. 9-10.

The aperture 530 can be positioned at a central portion of the second wall 515. For example, the aperture 530 can be positioned at least a first distance 531 (e.g., a height 521, or a combined distance of height 521 and height 523) from a bottom portion of the second wall 515 (depicted in at least FIG. 7). The aperture 530 can be positioned a first distance 531 from a bottom edge of the second wall 515 or a second distance 533 (e.g., a height 519) from a top edge of the second wall 515. The first distance 531 and the second distance 533 can be equal, or about (e.g., within 10%) equal. The first distance 531 and the second distance 533 can be different. The aperture 530 can also be positioned at an exterior portion of the second wall 515. For example, the aperture 530 can be positioned a third distance 532 (depicted in at least FIG. 9) from an interior portion of the second wall 515. The aperture 530 can be positioned the third distance 532 from an interior edge of the second wall 515 or a fourth distance 534 (depicted in at least FIG. 9) from an exterior edge of the second wall 515. The third distance 532 can be larger than the fourth distance 534. The third distance 532 and the fourth distance 534 can be equal, or about (e.g., within 10%) equal. The aperture 530 can also be positioned at another suitable location on the second wall 515 (e.g., a bottom portion, a top portion, an interior portion, extending from an exterior portion to an interior portion, or another position). The aperture 530 can be positioned at a suitable location at the second wall 515 (e.g., distance 531, distance 532, distance 533, distance 534, or another suitable location) such that when the thermistor 415 interfaces with the aperture 530, a probe of the thermistor 415 interfaces (e.g., contacts, touches, engages, or interacts with) an adjacent battery cell 120 (as depicted in at least FIG. 11).

The aperture 530 can be defined by at least one wall. For example, the aperture 530 can be defined by four walls, such that the aperture 530 can be a square aperture. The walls of the aperture 530 can engage (e.g., couple, interface, or otherwise interact with) components of the thermistor 415.

For example, the walls of the aperture 530 can engage (e.g., couple, interface, or interact with) a retention member of the thermistor 415 to facilitate positioning, orienting, or retaining the thermistor 415. The aperture 530 can have a width, for example a width of about (e.g., within 10%) 3.7 millimeters. The aperture 530 can also be defined by any suitable number of walls, such that the aperture 530 can be another suitable shape or configuration (e.g., circle, hexagonal, or oval, among other shapes).

The second wall 515 can include at least one recess 535 (depicted in at least FIGS. 5-6). For example, the recess 535 can extend into the second wall 515 from an interior surface of the second wall 515 (e.g., the surface 520) toward an exterior surface of the second wall 515. The recess 535 can also extend from an exterior portion of the second wall 515 (e.g., an exterior edge of the second wall 515), toward an interior portion of the second wall 515 (e.g., toward an interior portion of the exterior carrier 405). For example, the recess 535 can form a rectangular recess (e.g., groove, opening, void, or space) in the second wall 515. The recess 535 can interface a component of the thermistor 415. For example, a retention arm of the thermistor 415 can interface (e.g., contact, engage, guide, or interact with) the recess 535 as the thermistor 415 is inserted into the exterior carrier 405 to facilitate positioning, orienting, or guiding the thermistor 415 relative to the exterior carrier 405.

The recess 535 can be positioned at a central portion of the second wall 515. For example, the recess 535 can be positioned a first distance 536 from a bottom portion of the second wall 515 (depicted in at least FIG. 8). The recess 535 can be positioned the first distance 536 from a bottom edge of the second wall 515 or a second distance 538 from a top edge of the second wall 515. The first distance 536 and the second distance 538 can be equal, or about (e.g., within 10%) equal. The first distance 536 and the second distance 538 can be different. The recess 535 can also extend from an exterior portion of the second wall 515 toward an interior portion of the second wall 515, and can be defined at an interior portion by a protrusion. The recess 535 can form an opening (e.g., void or space) at an exterior portion of the second wall 515 and a protrusion at an interior portion of the second wall 515, for example to facilitate positioning, orienting, or retaining the thermistor 415. The recess 535 can also include the aperture 530. For example, the aperture 530 can be positioned within the recess 535 (as depicted in at least FIGS. 5-6). The recess 535 can also be positioned at another suitable location at the second wall 515 (e.g., a bottom portion, top portion, interior portion, or another portion), be another suitable shape or configuration (e.g., circle, hexagonal, or oval, among other shapes), or be otherwise oriented relative to the second wall 515 (e.g., extend vertically, or extend from an interior portion to an exterior portion).

Figure 11:
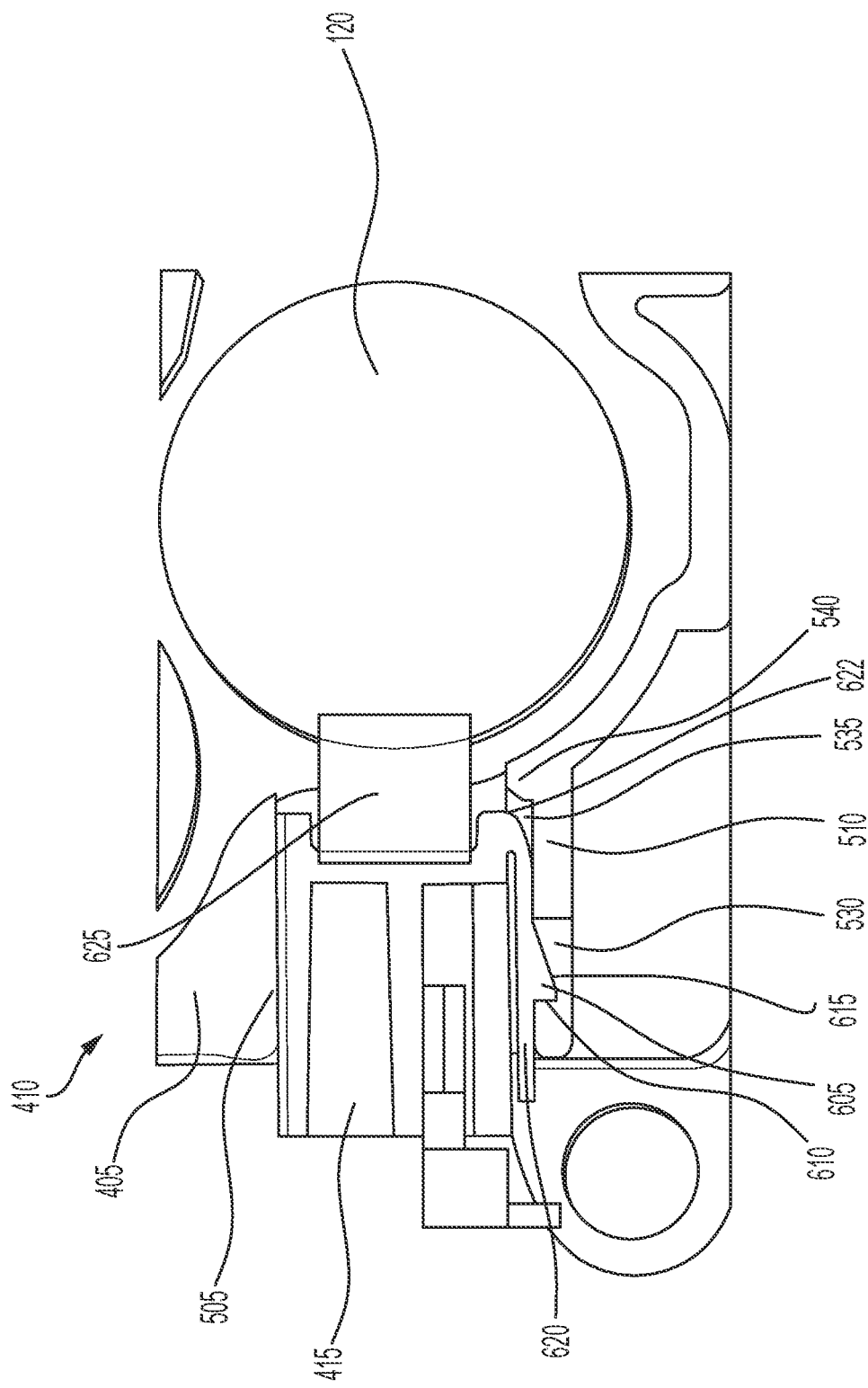
FIG. 11 depicts an example top view of the apparatus of FIG. 5 with a thermistor, in accordance with implementations.

The second wall 515 can include at least one protrusion 540 (depicted in at least FIG. 11). The protrusion 540 can contact (e.g., engage, couple, or otherwise interact with) a component of the thermistor 415. For example, the protrusion 540 can contact a retention arm of the thermistor 415 as the thermistor 415 is inserted into the exterior carrier 405. The protrusion 540 can contact the thermistor 415 to facilitate positioning, orienting, or retaining the thermistor 415 relative to the exterior carrier 405 (e.g., a battery cell 120 disposed therein). For example, the protrusion 540 can contact a retention arm of the thermistor 415 to limit (e.g., prevent, inhibit, or restrict) movement of the thermistor 415 relative to components of the battery module 115 (e.g., toward the battery cell 120 disposed within the exterior carrier 405).

The protrusion 540 can be positioned at a central portion of the second wall 515. For example, the protrusion 540 can be positioned the first distance 536 from a bottom edge of the second wall 515, or the second distance 538 from a top edge of the second wall 515. The protrusion 540 can also be positioned at an interior portion of the second wall 515 (e.g., toward an interior portion of the exterior carrier 405). For example, the protrusion 540 can be positioned at an interior end of the recess 535 (depicted in at least FIG. 11), such that the protrusion 540 can define an interior end of the recess 535. The protrusion 540 can form an angled or perpendicular interface, for example an interface within the recess 535. The protrusion 540 can be aligned with a surface of the second wall 515 (e.g., the surface 520), such that the protrusion 540 is continuous with the surface (e.g., the surface 520) of the second wall 515. The protrusion 540 can also be another suitable shape (e.g., square, round, circular, or oval, among other shapes), be positioned at another suitable location at the second wall (e.g., a bottom portion, top portion, exterior portion, or another portion), or be otherwise oriented relative to the second wall 515 (e.g., extend from a bottom portion to a top portion or extend to an exterior portion).

The apparatus 410 can include at least one third wall 545 (depicted in at least FIGS. 5-6). For example, the third wall 545 can extend between an exterior surface of the exterior carrier 405 and an interior surface of the exterior carrier 405. The third wall 545 can interface (e.g., contact, engage, guide, or otherwise interact) with the thermistor 415. For example, the third wall 545 can interface a housing of the thermistor 415 as the thermistor 415 is inserted into the exterior carrier 405, so as to guide or position the thermistor 415 relative to components of the apparatus 410. The third wall 545 can have a width and a length, or can include a first portion having a first width and a first length and a second portion having a second width and a second length. The third wall 545 can be rectangular, or another suitable shape or configuration (e.g., square, rectangular with an extension, hexagonal, circular, or oval, among other shapes). The third wall 545 can have any suitable shape or configuration (e.g., width or length) such that when the thermistor 415 interfaces with the third wall 545, a probe of the thermistor 415 interfaces (e.g., contacts, touches, engages, or otherwise interacts) with an adjacent battery cell 120.

The third wall 545 can include at least one surface 550 (not shown). For example, the surface 550 can be a planar surface to interface (e.g., contact, engage, guide, or otherwise interact with) with the thermistor 415. The surface 550 can be uniform or continuous, for example a smooth interface. The surface 550 can also be non-planar (e.g., curved, rounded, convex, concave, or another configuration), or include a textured interface (e.g., lattice, granulated, comb, lace, popcorn, or another interface). For example, the surface 550 can include a non-planar end or edge (e.g., curved, rounded, or chamfered) to facilitate guiding the thermistor 415 (e.g., during insertion or removal), or a textured interface (e.g., lattice or granulated interface) to facilitate retaining the position of the thermistor 415 relative to the third wall 545 (e.g., via a press-fit, friction, or other engagement).

The apparatus can include at least one fourth wall 555 (depicted in at least FIGS. 5-6). For example, the fourth wall 555 can extend between an exterior surface of the exterior carrier 405 and an interior surface of the exterior carrier 405. The fourth wall 555 can interface (e.g., contact, engage, guide, or otherwise interact) with the thermistor 415. For example, the fourth wall 555 can interface a housing of the thermistor 415 as the thermistor 415 is inserted into the exterior carrier 405, so as to guide or position the thermistor 415 relative to components of the apparatus 410. The fourth wall 555 can have a width and a length, or can include a first portion having a first width and a first length and a second portion having a second width and a second length. The fourth wall 555 can be rectangular, or another suitable shape or configuration (e.g., square, rectangular with an extension, hexagonal, circular, or oval, among other shapes). The fourth wall 555 can have any suitable shape or configuration (e.g., width or length) such that when the thermistor 415 interfaces with the fourth wall 555, a probe of the thermistor 415 interfaces (e.g., contacts, touches, engages, or otherwise interacts) with an adjacent battery cell 120.

The fourth wall 555 can include at least one surface 560 (depicted in at least FIGS. 5-6). For example, the surface 560 can be a planar surface to interface (e.g., contact, engage, guide, or otherwise interact) with the thermistor 415. The surface 560 can be uniform or continuous, for example a smooth interface. The surface 560 can also be non-planar (e.g., curved, rounded, convex, concave, or another configuration), or include a textured interface (e.g., lattice, granulated, comb, lace, popcorn, or another interface). For example, the surface 560 can include a non-planar end or edge (e.g., curved, rounded, or chamfered) to facilitate guiding the thermistor 415 (e.g., during insertion or removal), or a textured interface (e.g., lattice or granulated interface) to facilitate retaining the position of the thermistor 415 relative to the fourth wall 555 (e.g., via a press-fit, friction, or other engagement).

The third wall 545 and the fourth wall 555 can be parallel. For example, the third wall 545 and the fourth wall 555 can be parallel, and perpendicular to the first wall 505 and the second wall 515. The opening 525 can be defined at least in part by the third wall 545 and the fourth wall 555. The opening 525 can be defined at least in part by the first wall 505, the second wall 515, the third wall 545, and the fourth wall 555, for example to facilitate receiving the thermistor 415 (depicted in at least FIG. 8). The third wall 545 and the fourth wall 555 can be separated by a distance, for example the third wall 545 and the fourth wall 555 can be separated by a distance of about (e.g., within 10%) 17.3 millimeters.

The third wall 545 and the fourth wall 555 can be otherwise oriented, for example the third wall 545 can be angled (e.g., 15, 20, 25, 45, or other degrees) relative to the fourth wall 555, or the third wall 545 can be perpendicular to the fourth wall 555. The third wall 545 can also be otherwise oriented relative to the first wall 505 or the second wall 515. For example, the third wall 545 can be angled relative to the first wall 505 or the second wall 515 (e.g., 15, 20, 25, 45, or other degrees), or the third wall 545 can be parallel to the first wall 505 or the second wall 515. Similarly, the fourth wall 555 can also be otherwise oriented relative to the first wall 505 or the second wall 515. For example, the fourth wall 555 can be angled relative to the first wall 505 or the second wall 515 (e.g., 15, 20, 25, 45, or other degrees), or the fourth wall 555 can be parallel to the first wall 505 or the second wall 515. The opening 525 can be defined at least in part by the third wall 545 or the fourth wall 555, and the opening 525 can be any suitable shape or configuration (e.g., (e.g., rectangular, square, hexagonal, circular, or oval, among other shapes). The opening 525 can also be defined at least in part by the first wall 505, the second wall 515, the third wall 545, or the fourth wall 555, which can be any suitable shape or configuration. The third wall 545 or the fourth wall 555 can include additional components (e.g., an aperture, a recess, a protrusion, or other component), for example to facilitate positioning, orienting, or retaining the thermistor 415.

The apparatus 410 can be integrated with the exterior carrier 405 of the battery module 115, for example to facilitate uniformity or consistency in forming the exterior carrier 405 or the apparatus 410. The apparatus 410 can receive the thermistor 415, for example to position, orient, or retain the thermistor 415 relative to the exterior carrier 405 or the battery cell 120 disposed therein (depicted in at least FIG. 11). The apparatus 410 can position or orient the thermistor 415 relative to the battery cell 120, for example to facilitate determining a temperature profile of the battery cell 120 or surrounding components (e.g., a submodule, a battery module, a battery pack, or another component of a vehicle). The apparatus 410 can also retain the thermistor 415 to limit (e.g., restrict, prevent, or otherwise inhibit) movement of the thermistor 415 relative to the exterior carrier 405 or the battery cell 120 disposed therein. For example, the apparatus 410 can interface (e.g., receive, contact, engage, or otherwise interact) with components of the thermistor 415 to limit movement toward an interior portion of the exterior carrier 405 (e.g., into the battery cell 120). The apparatus 410 can also with interface with components of the thermistor 415 or limit movement out of (e.g., away from) the exterior carrier 405, for example to prevent back out of the thermistor 415 (e.g., in response to vehicle movement or displacement of the exterior carrier 405).

FIG. 11 depicts the apparatus 410 having received the thermistor 415. The thermistor 415 can include at least one retention member 605 (depicted in at least FIG. 11). The retention member 605 (e.g., protrusion, knob, ledge, flange, protuberance, or other component) can extend from the thermistor 415, and can contact one or more components of the apparatus 410. For example, the retention member 605 can extend from a side of the thermistor 415 (e.g., a lateral side, a top side, a bottom side, or another side). The retention member 605 can interface (e.g., fit into, be received within, or be disposed within) the aperture 530, for example to facilitate retaining the thermistor 415 in the exterior carrier 405. The retention member 605 can be a ramped protrusion (as depicted in FIG. 11). The retention member 605 can also be a hook, lip, indent, or other component.

The retention member 605 can include at least one retention interface 610 (e.g., a planar surface, or other surface), for example to contact a wall defining the aperture 530. The retention interface 610 can engage a wall defining the aperture 530 to prevent movement of the thermistor 415 relative to the exterior carrier 405 (e.g., back-out or away from).

The retention member 605 can also include at least one positioning interface 615 (e.g., an angled surface), for example to contact a surface of the recess 535. The positioning interface 615 can engage a surface of the recess 535, for example to facilitate positioning the thermistor 415 relative to the apparatus 410 (e.g., during insertion of the thermistor 415 into the exterior carrier 405). The positioning interface 615 can also engage a wall defining the aperture 530, for example to prevent movement of the thermistor 415 relative to the exterior carrier 405 (e.g., movement toward an interior portion of the exterior carrier 405 toward the battery cell 120).

The thermistor 415 can include at least one retention arm 620 (depicted in at least FIG. 11). The retention arm 620 can extend from the thermistor 415, and can contact one or more components of the apparatus 410. For example, the retention arm 620 can extend from a side of the thermistor 415 in a first direction (e.g., a direction away from a lateral side, a top side, a bottom side, or another side), or along a side of the thermistor 415 in a second direction (e.g., a direction aligned with a lateral side, a top side, a bottom side, or another side). The retention arm 620 can extend from a side of the thermistor 415 at an interior portion of the thermistor 415 (e.g., a portion of the thermistor 415 positioned adjacent to a battery cell). The retention arm 620 can also extend along a side of the thermistor 415, for example from an interior portion of the thermistor 415 toward an exterior portion of the thermistor 415. The retention arm 620 can interface (e.g., contact, fit into, be disposed within, or otherwise interact) with the recess 535, for example to facilitate positioning or orienting the thermistor 415 in the exterior carrier 405.

The retention member 605 can be coupled to the retention arm 620. For example, the retention member 605 can be coupled to a central portion of the retention arm 620, and can extend from the central portion of the retention arm 620 (e.g., extend away from the retention arm 620, away from a side of the thermistor 415). The retention arm 620 can be formed of a flexible material, such that the retention arm 620 can bias relative to components of the thermistor 415 (e.g., a housing). The retention arm 620 can also be formed of a suitable material (e.g., flexible material), such that the retention arm 620 returns to a standard configuration when the biasing force is removed. For example, the retention arm 620 can bias (e.g., flex inward) as the retention arm 620 engages a surface of the recess 535 (e.g., during insertion of the thermistor 415 into the exterior carrier 405). Further, the retention arm 620 can bias (e.g., flex outward) as the retention arm 620 is positioned within the recess 535, for example positioned such that the retention member 605 interfaces with (e.g., is received within or is disposed within) the aperture 530. The biasing characteristics of the retention arm 620 can facilitate positioning, orienting, or retaining the thermistor 415 relative to the exterior carrier 405 or components of the apparatus 410.

The retention arm 620 can also include at least one positioning interface 622, for example to contact a surface of the recess 535. The positioning interface 622 can engage a surface of the recess 535, for example to facilitate positioning the thermistor 415 relative to the apparatus 410 (e.g., during insertion of the thermistor 415 into the exterior carrier 405). The positioning interface 622 can also engage the protrusion 540, for example to facilitate positioning of the thermistor 415 relative to the apparatus 410. The positioning interface 622 can engage (e.g., contact or touch) the protrusion 540 to prevent movement of the thermistor 415 relative to the exterior carrier 405 (e.g., movement toward an interior portion of the exterior carrier 405 toward the battery cell 120).

The thermistor 415 can include at least one probe 625 (as depicted in at least FIG. 11). The probe 625 can extend from the thermistor 415, and can interact (e.g., contact, touch, engage, or otherwise communicate) with an adjacent battery cell 120. For example, when the thermistor 415 is received by the apparatus 410 (as depicted in at least FIG. 11), the probe 625 can interface (e.g., contact or touch) an exterior surface of the battery cell 120 to facilitate determining a temperature profile of the battery cell 120. When the thermistor 415 is received by the apparatus 410, the probe 625 can be positioned a distance from an exterior surface of the battery cell 120 to facilitate determining a temperature profile of the battery cell 120. For example, the probe 625 can be a distance of about (e.g., within 10%) 10 millimeters, a distance of about (e.g., within 10%) 5 millimeters, a distance of about (e.g., within 10%) 2.5 millimeters, or another distance from an exterior surface of the battery cell 120 to facilitate determining a temperature profile of the battery cell 120. The probe 625 can include a pad, film, or other suitable material to facilitate determining a temperature profile of the battery cell 120. For example, the probe 625 (e.g., a pad or film of the probe 625) can be used to monitor changes in temperature of the battery cell 120 (e.g., a surface of the battery cell 120 or an area surrounding a surface of the battery cell 120), which can be used to facilitate determining a temperature profile (e.g., absolute temperature, relative temperature, change in temperature, among other temperature characteristics) of the battery cell 120. The probe 625 can be used to determine a temperature profile of the battery cell 120, which can also be used to determine a temperature profile of one or more components of the vehicle 105 (e.g., the first submodule 220, the second submodule 225, the battery module 115, the battery pack 110, or another component of the vehicle 105).

The thermistor 415 can include a housing having at least one surface. For example, the surface can be a planar or continuous surface to interface (e.g., contact, engage, guide, or otherwise interact) with a wall of the apparatus 410 (e.g., the first wall 505, or another wall) to facilitate positioning or orienting the thermistor 415 relative to the exterior carrier 405. The surface can also be non-planar (e.g., curved, rounded, convex, concave, or another shape) or include a textured interface (e.g., lattice, granulated, comb, lace, popcorn, or other interface), and can facilitate guiding or retaining the thermistor 415 relative to components of the apparatus 410. The thermistor 415 can include a single retention member 605 coupled to a single retention arm 620. The thermistor 415 can also include the retention arm 620 having a plurality of retention member 605 (e.g., two, three, four, five, or another number). The thermistor 415 can include a plurality of retention arms 620, for example a first retention arm 620 at a first portion of the thermistor 415 (e.g., a first side of a housing) and a second retention arm 620 at a second portion of the thermistor 415 (e.g., a second side of a housing).

Figure 12:
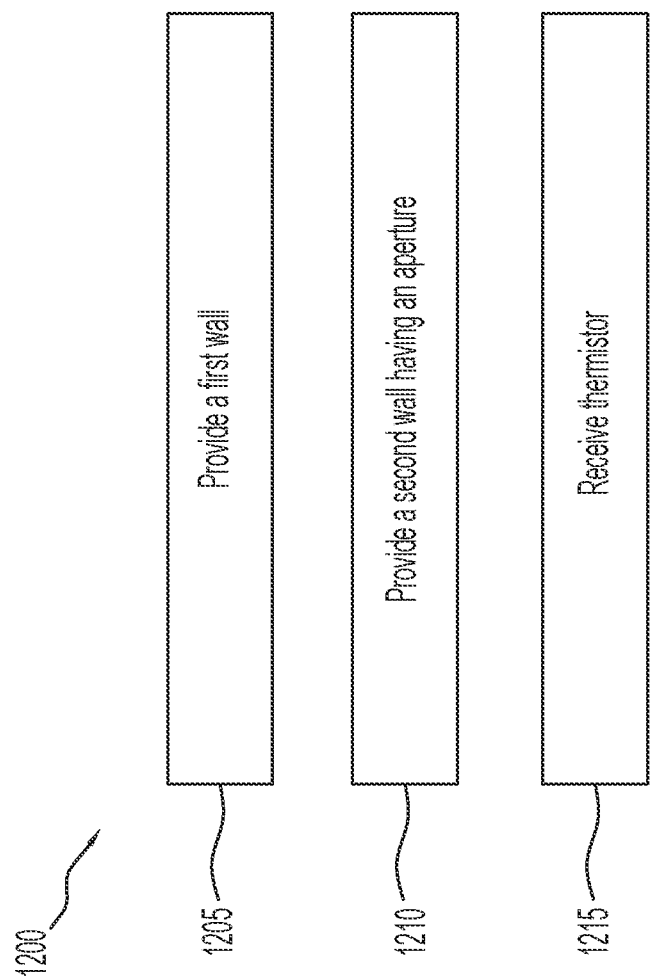
FIG. 12 depicts an example illustration of a method, in accordance with implementations.

FIG. 12 depicts an illustration of a method 1200. The method 1200 can include one or more ACTS 1205-1215. The method 1200 can include providing a first wall 505, as depicted at ACT 1205. For example, the first wall 505 can be integrated with the exterior carrier 405 or provided with the exterior carrier 405. The first wall 505 can be positioned at an exterior portion of the exterior carrier 405, for example a bottom portion of a corner of the exterior carrier 405 or a top portion of a corner of the exterior carrier 405. The first wall 505 can extend between an exterior surface of the exterior carrier 405 and an interior surface of the exterior carrier 405. The first wall 505 can interface (e.g., contact, engage, guide, or otherwise interact) with the thermistor 415, for example the first wall 505 can contact a housing of the thermistor 415 (e.g., as the thermistor 415 is inserted into the exterior carrier 405).

The method 1200 can include providing a second wall 515, as depicted at ACT 1210. For example, the second wall 515 can be integrated with the exterior carrier 405 or provided with the exterior carrier 405. The second wall 515 can be positioned at an exterior portion of the exterior carrier 405, for example a bottom portion of a corner of the exterior carrier 405 or a top portion of a corner of the exterior carrier 405. The second wall can extend between an exterior portion of the exterior carrier 405 and an interior surface of the exterior carrier 405. The first wall 505 and the second wall 515 can define the opening 525, for example to facilitate receiving the thermistor 415. The first wall 505 and the second wall 515 can be separated by a distance (e.g., the distance 526), or can be parallel so as to define the opening 525. Further, the second wall 515 can interface (e.g., contact, engage, guide, or otherwise interact) with components of the thermistor 415, for example as the thermistor 415 is inserted into the exterior carrier 405.

The second wall 515 can include the aperture 530. The aperture 530 can extend from an interior surface of the second wall 515 (e.g., the surface 520) to an exterior surface of the second wall 515. The aperture 530 can be positioned at a central portion of the second wall 515, or an exterior portion of the second wall 515. The aperture 530 can be defined by at least one wall, for example the aperture 530 can be defined by four walls such that the aperture 530 is a square aperture. The aperture 530 can receive a component of a thermistor. For example, the aperture 530 can receive the retention member 605 of the thermistor 415. The aperture 530 can also extend to an exterior surface of the exterior carrier 405, for example to facilitate visual inspection of the positioning or orienting of the thermistor 415 relative to the second wall 515 (e.g., the aperture 530).

The method 1200 can include providing an opening 525. The opening 525 can be defined at least in part by the first wall 505 and the second wall 515. For example, the opening 525 can be defined by at least the first wall 505 and the second wall 515, and the opening 525 can be configured to receive a thermistor (e.g., the thermistor 415). The first wall 505 or the second wall 515 can be oriented such that the opening 525 is a suitable shape or configuration. For example, the opening 525 can be rectangular, square, hexagonal, circular, or oval, among other shapes.

The method 1200 can include receiving a thermistor, as depicted at ACT 1215. For example, the thermistor 415 can be received at the first wall 505 and the second wall 515. The thermistor 415 can interface (e.g., contact, engage, or otherwise interact) with the first wall 505, for example to guide the thermistor 415 as the thermistor 415 is inserted into the exterior carrier 405. The thermistor 415 can interface (e.g., contact, engage, or otherwise interact) with the second wall 515, for example to guide the thermistor 415 as the thermistor 415 is inserted into the exterior carrier 405. The aperture 530 can receive a retention member of the thermistor 415. For example, the first wall 505 or the second wall 515 can interface (e.g., contact or engage) the thermistor 415, such that the retention member 605 of the thermistor 415 is disposed within (e.g., fit into or received within) the aperture 530. The retention member 605 of the thermistor 415 can be disposed within the aperture 430, for example to facilitate retaining the thermistor 415 within the exterior carrier 405 (e.g. to prevent or limit back-out or movement of the thermistor 415 away from the exterior carrier 405).

The method 1200 can also include providing the second wall 515 having a recess. For example, the second wall 515 can include the recess 535. The recess 535 can extend from an exterior portion of the second wall 515 toward an interior portion of the second wall 515, and can interface (e.g., contact, engage, guide, or otherwise interact) with a component of the thermistor 415. For example, a retention arm of the thermistor 415 can interface with the recess 535 to facilitate positioning, orienting, or guiding the thermistor 415 relative to the exterior carrier 405 (e.g., during insertion or removal). The method 1200 can also include providing the second wall 515 having a protrusion. For example, the second wall 515 can include the protrusion 540. The protrusion 540 can be positioned at a central portion of the second wall 515 (e.g., at an end of the recess 535), and can interface a component of the thermistor 415. For example, the protrusion 540 can contact a retention arm of the thermistor 415 as the thermistor 415 is inserted into the exterior carrier 405. The protrusion 540 can contact a retention arm of the thermistor 415 to limit (e.g., prevent, inhibit, or otherwise restrict) movement of the thermistor 415 relative to components of the battery module 115 (e.g., toward a battery cell disposed within the exterior carrier).

FIG. 13 depicts an illustration of a method 1300. The method 1300 can include providing the apparatus 410, as depicted at ACT 1305. The apparatus 410 can include the first wall 505. The apparatus 410 can include the second wall 515, the second wall 515 having the aperture 530. The apparatus can include the opening 525 defined by the first wall 505 and the second wall 515, for example to facilitate receiving the thermistor 415. The aperture 530 can receive the retention member 605 of the thermistor 415 to facilitate positioning, orienting, or retaining the thermistor 415 relative to the apparatus 410, the exterior carrier 405, or an adjacent battery cell 120. The aperture 530 can also receive the retention member 605 of the thermistor 415 to dispose the thermistor 415 in the battery module 115 or components thereof (e.g., the first submodule 220, the second submodule 225, or the exterior carrier 405).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations,"

"one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. References to top or bottom, or other orientations, can indicate positioning when the battery pack 110 is in an orientation such as an installed orientation in the electric vehicle 105.

Other substitutions, modifications, changes and omissions can also be made in the design, operating conditions and arrangement of the disclosed elements and operations without departing from the scope of the present disclosure. For example, the apparatus 410 can include several apertures 530 or recesses 535 that interface with components of the thermistor 415. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a first wall and a second wall, the second wall having an aperture; and
an opening defined at least in part by the first wall and the second wall, the opening configured to receive a thermistor,
the aperture configured to receive a retention member of the thermistor to dispose the thermistor in a battery module.

2. The apparatus of claim 1, comprising:
the first wall having a planar surface to contact the thermistor with the retention member of the thermistor disposed within the aperture, the retention member having a retention interface to engage a wall defining the aperture to retain the thermistor in the battery module.

3. The apparatus of claim 1, comprising:
the aperture positioned a first distance from a bottom edge of the second wall and a second distance from a top edge of the second wall, wherein the first distance and the second distance are equal.

4. The apparatus of claim 1, comprising:
the aperture positioned a first distance from an interior edge of the second wall and a second distance from an exterior edge of the second wall, the first distance being larger than the second distance.

5. The apparatus of claim 1, comprising:
the first wall and the second wall separated by a first distance, the first wall arranged in parallel with the second wall.

6. The apparatus of claim 1, comprising:
the second wall having a recess that extends from an exterior portion of the second wall to an interior portion of the second wall, the recess to contact a retention arm of the thermistor.

7. The apparatus of claim 1, comprising:
the second wall having a recess formed in an interior surface of the second wall, the recess to contact a positioning interface of a retention arm of the thermistor to position the thermistor in the battery module.

8. The apparatus of claim 1, comprising:
the second wall having a protrusion, the protrusion to contact a positioning interface of a retention arm of the thermistor to prevent movement of the thermistor into an interior portion of the battery module.

9. The apparatus of claim 1, comprising:
a third wall and a fourth wall, the third wall parallel to the fourth wall, and the third wall perpendicular to the first wall and to the second wall; and
the opening defined at least in part by the first wall, the second wall, the third wall, and the fourth wall to receive the thermistor.

10. The apparatus of claim 1, wherein the apparatus includes a battery pack submodule.

11. A battery pack, comprising:
a carrier;
a battery cell disposed within the carrier; and
a thermistor coupled with the carrier and the battery cell, the thermistor configured to indicate a temperature of the battery cell, the carrier further comprising:
a first wall and a second wall, the second wall having an aperture; and
an opening defined at least in part by the first wall and the second wall, the opening configured to receive the thermistor, the aperture configured to receive a retention member of the thermistor to dispose the thermistor in the carrier.

12. The battery pack of claim 11, comprising:
the opening positioned at a corner of the carrier, the corner at an exterior portion and a bottom portion of the carrier.

13. The battery pack of claim 11, comprising:
the opening positioned at a corner of the carrier, the corner at an exterior portion and a top portion of the carrier.

14. The battery pack of claim 11, comprising:
the thermistor having a single retention arm with the retention member to interface with the aperture of the second wall, the retention arm formed of a flexible material configured to bias to dispose the retention member within the aperture, and the retention member having a retention interface to engage a wall defining the aperture to retain the thermistor in the carrier.

15. The battery pack of claim 11, comprising:
the second wall having a recess extending from an exterior portion of the second wall to an interior portion of the second wall, the recess to contact a positioning interface of a retention arm of the thermistor to position the thermistor in the carrier.

16. The battery pack of claim 11, comprising:
the second wall having a protrusion, the protrusion to contact a positioning interface of a retention arm of the thermistor to prevent movement of the thermistor into an interior portion of the carrier.

17. The battery pack of claim 11, comprising:
another carrier;
another battery cell disposed within the carrier; and
another thermistor coupled with the other carrier and the other battery cell, the other thermistor configured to indicate a temperature of the other battery cell, the other carrier further comprising:
a first wall and a second wall, the second wall having an aperture; and
an opening defined at least in part by the first wall and the second wall, the opening configured to receive the other thermistor,
the aperture configured to receive a retention member of the other thermistor to dispose the other thermistor in the other carrier,
the opening of the carrier positioned at a corner of the carrier, the corner being at an exterior portion and a top portion of the carrier, and
the opening of the other carrier positioned at a corner of the other carrier, the corner being at an exterior portion and a bottom portion of the other carrier.

18. A method, comprising:
providing a first wall and a second wall, the second wall having an aperture;
providing an opening defined at least in part by the first wall and the second wall; and
receiving a thermistor at the opening with a retention member of the thermistor disposed within the aperture to dispose the thermistor in a battery module.

19. The method of claim 18, comprising:
providing the second wall having a recess extending from an exterior portion of the second wall to an interior portion of the second wall, the recess to contact a positioning interface of a retention arm of the thermistor to position the thermistor in the battery module.

20. The method of claim 18, comprising:
providing the second wall having a protrusion, the protrusion to contact a positioning interface of a retention arm of the thermistor to prevent movement of the thermistor into an interior portion of the battery module.

* * * * *